United States Patent [19]

Oyama et al.

[11] Patent Number: 5,891,822

[45] Date of Patent: Apr. 6, 1999

[54] PRODUCTION PROCESS OF ACTIVE CARBON USED FOR ELECTRODE FOR ORGANIC SOLVENT TYPE ELECTRIC DOUBLE LAYER CAPACITOR

[75] Inventors: Shigeki Oyama; Naohiko Oki; Minoru Noguchi, all of Wako, Japan

[73] Assignee: Honda Giken Kogyo Kabushiki Kaisha, Tokyo, Japan

[21] Appl. No.: 931,685

[22] Filed: Sep. 16, 1997

[30] Foreign Application Priority Data

Sep. 17, 1996 [JP] Japan ..................... 8-265095

[51] Int. Cl.$^6$ ..................... B01J 20/02
[52] U.S. Cl. ..................... 502/427; 423/445 R
[58] Field of Search ..................... 423/460, 445 R; 502/423, 427

[56] References Cited

U.S. PATENT DOCUMENTS

| 4,584,456 | 4/1986 | Oodaira et al. | 219/121 LM |
|---|---|---|---|
| 4,867,852 | 9/1989 | Nakao et al. | 423/447.2 |
| 4,946,663 | 8/1990 | Audley et al. | 423/460 |
| 5,190,696 | 3/1993 | Fujii et al. | 423/445 R |

FOREIGN PATENT DOCUMENTS 09275042  10/1997  Japan .

OTHER PUBLICATIONS

"Evaluation of Activated Carbon Electrodes for Electric Double Layer Capacitors Using an Organic Electrolyte Solution", Hiratsuka et al, *Electrochemistry*, vol. 59, No. 7, 1991, pp. 607–613, no month.

*Primary Examiner*—Michael Lewis
*Assistant Examiner*—Stuart L. Hendrickson
*Attorney, Agent, or Firm*—Nikaido Marmelstein Murray & Oram LLP

[57] ABSTRACT

Disclosed herein is a process for producing active carbon suitable for use in electrodes for an organic solvent type electric double layer capacitor, comprising calcining an easily graphitizable organic substance and then subjecting the resultant carbonized product to an alkali activation treatment, wherein the alkali activation treatment comprises a first alkali activation treatment at a temperature within a first range and a second alkali activation treatment at a temperature within a second range, said temperature within the second range being higher than that of the first activation treatment, and one of both alkali activation treatments is performed after the other alkali activation treatment.

12 Claims, 2 Drawing Sheets

PRODUCTION PROCESS OF ACTIVE CARBON USED FOR ELECTRODE FOR ORGANIC SOLVENT TYPE ELECTRIC DOUBLE LAYER CAPACITOR

BACKGROUND OF THE INVENTION

1. Field of the Invention

The present invention relates to a process for producing active carbon used for polarizable electrodes for an electric double layer capacitor making use of an electrolytic organic solvent solution.

2. Description of the Background Art

Since an electric double layer capacitor has a large capacity of the farad level and is also excellent in charge and discharge cycle properties, it is used in applications such as back up power supplies for electronic equipment and batteries for automobiles.

In this electric double layer capacitor, for example, as illustrated in FIG. 3, a pair of polarizable electrodes 1, 1 composed of active carbon are arranged in an opposed relation to each other through a separator 2, and the polarizable electrodes 1, 1 are impregnated with an organic solvent solution of a tetraalkylammonium salt or the like as an electrolytic solution so as to function as positive and negative electrodes, respectively. In the electric double layer capacitor illustrated in FIG. 3, the polarizable electrodes 1, 1 opposed to each other through the separator 2 are contained in an aluminum container 3 which is closed with an aluminum lid 5 through a packing 4. In the above-described construction, the container 3 and the lid 5 come into separate contact with the polarizable electrodes 1, 1 in such a manner that the container 3 serves as a current collector member on the cathode side to the polarizable electrode 1, and the lid 5 serves as a current collector member on the anode side to the other polarizable electrode 1.

Although active carbon having fine pores is used for the polarizable electrodes for such an electric double layer capacitor, there is a demand for development of active carbon capable of more heightening the capacity density of the polarizable electrodes for the purpose of providing a smaller and lighter electric double layer capacitor having a greater capacity.

Therefore, various properties of active carbon have been investigated with a view toward providing active carbon capable of heightening the capacity density of the polarizable electrodes. For example, the hypothesis that "A capacity density per weight of active carbon in an electrode has an almost linear proportional relationship with a specific surface area of the active carbon, and the capacity of an electric double layer on the active carbon electrode is about constant without being affected by the kind of carbon and pore characteristics thereof" has been proposed (Electrochemistry, 59, No. 7, pp. 607–613, 1991).

When a theoretical value of the capacity of an electric double layer capacitor comprising polarizable electrodes making use of such active carbon is found from a value observed by a mercury electrode or the like as the capacity of the electric double layer of the active carbon and the specific surface area of the active carbon, however, the theoretical value does not consist with the found value of the capacity of the electric double layer capacitor.

For example, assuming that the capacity of the electric double layer capacitor so constructed that a pair of polarizable electrodes 1, 1 are arranged with a separator 2 held therebetween as illustrated in FIG. 3 is $C_0$, and capacities of the polarizable electrodes 1, 1 are $C_1$ and $C_2$, the following equation is satisfied:

$$1/C_0 = 1/C_1 + 1/C_2 \quad (1)$$

Here, the capacity of the electric double layer on the active carbon observed by the mercury electrode is about 20 $\mu F/cm^2$. Therefore, the capacity of the electric double layer on active carbon having a specific surface area of 1,500 $m^2/cc$ amounts to:

20 ($\mu F/cm^2$)×1,500 ($m^2/cc$)=300 (F/cc).

Then, 300 (F/cc) is substituted for $C_1$ and $C_2$ in the equation (1) to find $C_0$. As a result, $C_0$ amounts to 150 (F/cc). Since $C_0$ is a capacity for two volumes of the polarizable electrode 1, the theoretical capacity of the electric double layer capacitor should amount to 75 F/cc obtained by dividing the $C_0$ value by 2.

In reality, the capacity of the electric double layer capacitor amounts to only about 13 F/cc. Even when different kinds of active carbon having the same specific surface area are used, the capacities of the resultant electric double layer capacitors may be entirely different from each other in some cases.

Therefore, the present inventors paid attention to the fact that the above hypothesis is based on the specific surface area measured by nitrogen gas absorption in accordance with the BET method the analytical limit of which is about 10 angstroms, and attempted a special image analysis capable of analyzing even fine pores smaller than 10 angstroms by using an image through a transmission electron microscope in order to verify the above hypothesis, thereby investigating the relationship between capacity density and specific surface area as to various kinds of active carbon for electrodes different in specific surface area. As a result, the conclusion that there is no linear proportional relationship between them, and so factors affecting the capacity exist in some others was reached.

The present inventors carried out a further investigation on the basis of this finding. As a result, it was found that when a mode in the pore distribution of active carbon is controlled to a pore size suitable for adsorption of the electrolytic solution ions with the organic solvent solvated, active carbon excellent in capacity density per volume when used in polarizable electrodes for an electric double layer capacitor is provided. Such active carbon used for electrodes for the electric double layer capacitor was previously applied for patent (Japanese Patent Application No. 46912/1996). The active carbon described in the specification of this application is such that a carbonized product obtained by calcining a vinyl chloride resin is activated with an alkali in one stage by holding it for 1–20 hours at a temperature ranging from 400° C. to 1,000° C. The mode in its pore distribution is within a range of 10–20 angstroms, which are pore sizes suitable for adsorption of the electrolytic solution ions with the organic solvent solvated.

Incidentally, the mode means a value of a pore size which shows the highest relative frequency in the frequency distribution of pore sizes. Besides, the frequency distribution of pore sizes is found from a power spectrum obtained by converting the image of the active carbon through a transmission electron microscope into a binary image and subjecting this binary image to Fourier transformation.

According to such active carbon, a polarizable electrode high in electrode density and, in particular, excellent in capacity density per volume can be formed because the mode in its pore distribution falls within the above range, and an electric double layer capacitor high in energy density can be constructed by such polarizable electrodes.

However, the polarizable electrodes making use of the active carbon obtained by conducting the activation treatment under such conditions that the electrode density can be made high as described above involve a disadvantage that the resulting electric double layer capacitor is easy to lower the capacity by repeated charge and discharge.

SUMMARY OF THE INVENTION

Accordingly, it is an object of the present invention to provide a process for producing active carbon from which polarizable electrodes having a high electrode density and scarcely lowering its capacity even when repeatedly charged and discharged can be provided.

The above object can be achieve by the present invention described below.

According to an aspect of the present invention, there is thus provided a process for producing active carbon suitable for use in electrodes for an organic solvent type electric double layer capacitor, comprising calcining an easily graphitizable organic substance and then subjecting the resultant carbonized product to an alkali activation treatment, wherein the alkali activation treatment comprises a first alkali activation treatment at a temperature within a first range and a second alkali activation treatment at a temperature within a second range, said temperature within the second range being higher than that of the first activation treatment, and one of both alkali activation treatments is performed after the other alkali activation treatment.

According to the present invention, the carbonized product obtained by carbonizing the easily graphitizable organic substance is subjected to the first alkali activation treatment at the temperature within the first range, thereby ensuring that the resulting active carbon can have fine pores. Such active carbon has a high carbon density and can hence provide electrodes the electrode density of which becomes high when used as polarizable electrodes for an electric double layer capacitor, thereby permitting heightening its capacity density per volume.

According to the present invention, the carbonized product is subjected to the second alkali activation treatment at the temperature within the second range, thereby obtaining active carbon with functional groups present on the surface of the carbonized product removed therefrom. Such active carbon can prevent capacity from lowering by repeated charge and discharge when it is used as polarizable electrodes for an electric double layer capacitor.

Therefore, the two-stage alkali activation treatment at different temperatures according to the present invention can provide active carbon which has a high capacity density per volume and can prevent capacity from lowering by repeated charge and discharge when it is used as polarizable electrodes for an electric double layer capacitor.

In the present invention, no particular limitation is imposed on the order of both alkali activation treatments. Therefore, the second alkali activation treatment may be performed after the first alkali activation treatment, and reversely the first alkali activation treatment may be carried out after the second alkali activation treatment.

A feature of the present invention resides in that one of both alkali activation treatments is performed subsequently to the other alkali activation treatment. According to the present invention, both alkali activation treatments are successively performed, whereby the process can be simplified to reduce the production cost.

In an alkali activation treatment, a post treatment, in which the resultant active carbon is washed with water, and neutralized and washed to remove an unreacted activator, contaminants and the like, is generally conducted after the activation treatment. Therefore, the term "both alkali activation treatments are successively performed" as used herein means that for example, when the second alkali activation treatment is performed subsequently to the first alkali activation treatment, the second alkali activation treatment is conducted as it is without performing the above post treatment after the first alkali activation treatment.

The easily graphitizable organic substance used in the present invention generally designates an organic compound from which a graphite structure is easily formed by a calcination treatment at a relatively low temperature, for example, about 800° C. or lower. Examples thereof may include aliphatic high-molecular compounds such as vinyl chloride resins and polyacrylonitrile; and besides aromatic high-molecular compounds such as tar, mesophase pitch and polyimide. However, the vinyl chloride resins are preferred from the viewpoint of production cost. The formation of the graphite structure can be confirmed by, for example, its X-ray diffraction pattern in which $2\theta$ has a clear peak at about 25°.

As described above, the easily graphitizable organic substance is subjected to a calcination treatment at about 800° C. or lower, thereby forming the graphite structure. In the present invention, the easily graphitizable organic substance is heated from room temperature to a temperature lower than 700° C., whereby the graphite structure can be formed, and moreover fine pores the pore size of which becomes suitable for polarizable electrodes for the electric double layer capacitor when the resultant carbonized product is converted into active carbon by the above-described activation treatment can be formed. Incidentally, if the calcination temperature exceeds 700° C., the carbonized product obtained is sintered, so that the pore thus formed are blocked up, resulting in difficulty in conducting the activation treatment.

The first alkali activation treatment of the carbonized product obtained by the calcination of the easily graphitizable substance is characterized in that the treatment is conducted at a temperature ranging from 600 to 950° C. If the first alkali activation treatment is conducted at a temperature lower than 600° C., the activation is difficult to be advanced, resulting in active carbon which can not provide a sufficient capacity. If the temperature exceeds 950° C. on the other hand, the activation becomes too high, resulting in active carbon the pore size of which is entirely enlarged and the density of which is markedly lowered. The first alkali activation treatment is preferably conducted at a temperature ranging from 800 to 900° C., in particular, of about 860° C. from the viewpoint of production cost.

The first alkali activation treatment is also characterized in that the carbonized product is held for 1–20 hours at the temperature within the above range. If the holding time at the temperature within the above range is shorter than 1 hour, it is impossible to form sufficient pores. If the holding time exceeds 20 hours on the other hand, the activation becomes too high, resulting in active carbon in which the number of pores enlarged in pore size is increased. The holding time at the temperature within the above range is preferably 2–10 hours, in particular, about 4 hours from the viewpoint of production cost.

The second alkali activation treatment of the carbonized product is characterized in that the treatment is conducted at a temperature ranging from 800 to 1,000° C. and higher than that of the first activation treatment. If the second alkali activation treatment is conducted at a temperature lower than 800° C., it is difficult to make a sufficient difference in temperature from the first alkali activation treatment, resulting in difficulties in removing functional groups present on the surface of the carbonized product and moderately enlarging pore size. If the temperature exceeds 1,000° C. on the other hand, the activation becomes too high even by a short-time treatment, so that unnecessary reduction in density is incurred.

The second alkali activation treatment is conducted by raising the temperature of the carbonized product to the temperature within the above range and then immediately lowering the temperature, or holding the carbonized product for 2 hours or shorter at the temperature within the above range. If the holding time at the temperature within the above range exceeds 2 hours, the activation becomes too high. The holding time at the temperature within the above range is preferably 1 hour or shorter, in particular, about 0.5 hours from the viewpoint of production cost.

In the present invention, when the alkali activation treatment is performed with a monovalent base of an alkali metal hydroxide as an activator, pores having a pore size of 20 angstroms or smaller can be easily formed. Examples of the alkali metal hydroxide may include lithium hydroxide, sodium hydroxide and potassium hydroxide. Of these, potassium hydroxide is preferred because it is cheap.

The alkali activation treatment with the activator is characterized in that the alkali metal hydroxide is used in a proportion of 1–4 parts by weight per 1 part by weight of the carbonized product. If the proportion of the activator per 1 part by weight of the carbonized product is lower than 1 part by weight, the activation is difficult to be sufficiently advanced. If the proportion exceeds 4 parts by weight on the other hand, there is a possibility that when a polarizable electrode for an electric double layer capacitor is formed from the resulting active carbon, the capacity density per volume of the polarizable electrode may be lowered.

The proportion of the activator is preferably 1.5–3 parts by weight, in particular, 1.8–2.2 parts by weight, per 1 part by weight of the carbonized product in order to ensure that the resulting electric double layer capacitor has a sufficient capacity.

In this embodiment, the carbonized product is ground into particles having a particle size ranging from 0.1 to 300 μm before the alkali activation treatment, whereby the activation in the interiors of the particles can be evenly performed. If the particle size of the carbonized product is smaller than 0.1 μm, there is a possibility that when a polarizable electrode for an electric double layer capacitor is formed from the resulting active carbon, the self-discharge resistance thereof may be deteriorated. If the particle size exceeds 300 μm, there is a possibility that the activation in the interiors of such particles may be difficult to be evenly advanced. The carbonized product may preferably be ground into particles having a particle size of 1–100 μm for the purpose of more evenly performing the activation in the interiors of the particles.

Other objects, features and advantages of the present invention will be readily appreciated from the preferred embodiments of the present invention, which will be described subsequently in detail with reference to the accompanying drawings.

DETAILED DESCRIPTION OF THE PREFERRED EMBODIMENTS

A preferred embodiment of the production process of active carbon according to the present invention will hereinafter be described in more detail with reference to the accompanying drawings.

In this embodiment, a vinyl chloride resin, which is useful from the viewpoint of production cost, is used as the easily graphitizable organic substance. The vinyl chloride resin is first calcined to carbonize it.

Figure 1:
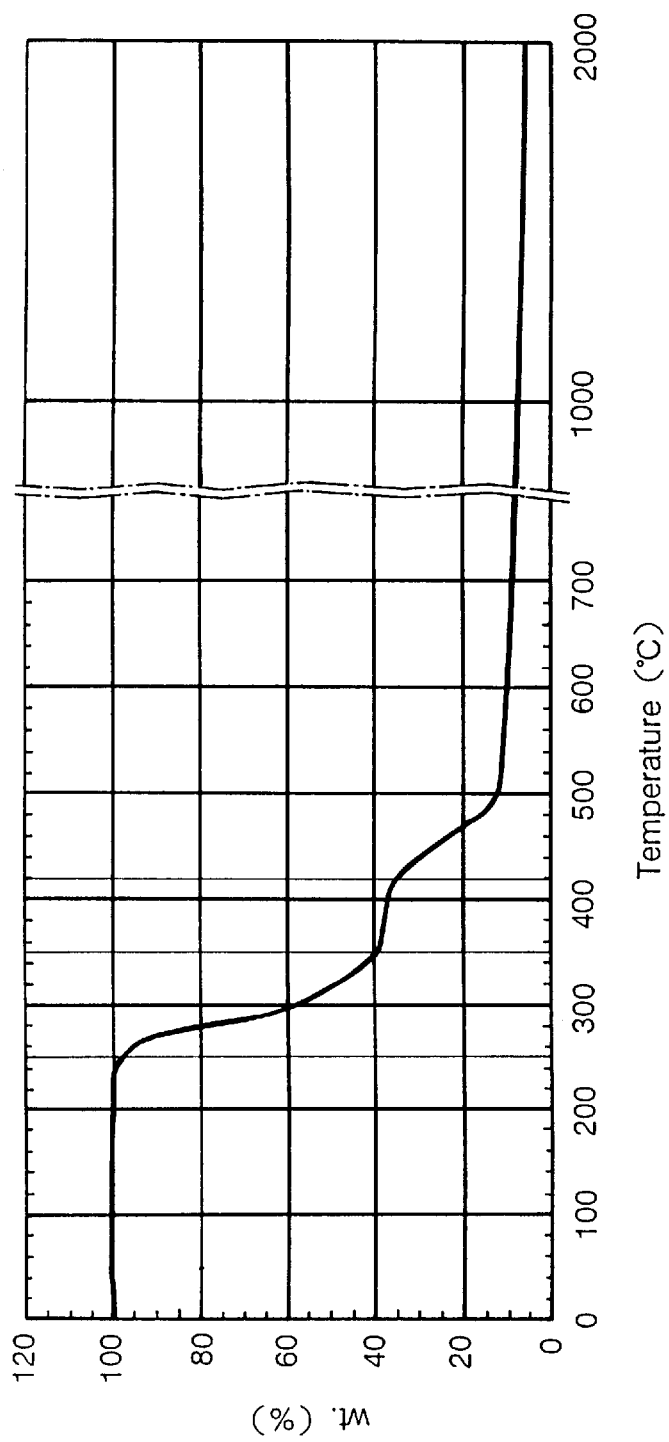
FIG. 1 illustrates a thermogravimetric chart of a vinyl chloride resin.

As illustrated in FIG. 1, the vinyl chloride resin exhibits two-stage weight loss of first-stage weight loss beginning with about 250° C. and ending with about 350° C., and second-stage weight loss beginning with about 420° C. and ending with about 500° C. when it is gradually heated from room temperature. From the thermogravimetric chart illustrated in FIG. 1, it is considered that when the vinyl chloride resin is calcined, side chains are eliminated from the resin in a temperature range of from about 250° C., at which the first-stage weight loss begins, to about 420° C., at which the second-stage weight loss begins, whereby the carbon skeleton of active carbon is formed, and chlorine is eliminated from the resin in a temperature range of from about 420° C., at which the second-stage weight loss begins, to about 700° C., whereby relatively large pores are formed.

It is also considered that hydrogen is eliminated from the resin in a temperature range of from about 700° C. to about 1,000° C., whereby relatively fine pores are formed, carbon is sintered in a temperature range of from about 1,000° C. to about 2,000° C., whereby the pore formed are partially blocked up, and the carbon skeleton is rearranged at a temperature exceeding about 2,000° C., whereby the large and fine pores formed are made closer and finer. Accordingly, even when the resin is heated to 1,000° C. or higher, it can not be expected to enhance the capacity when a polarizable electrode for an electric double layer capacitor is formed from the resultant active carbon.

Therefore, the calcination of the vinyl chloride resin is conducted by heating it from room temperature to 600° C. in an atmosphere of an inert gas such as nitrogen gas or argon gas in this embodiment. The calcination of the vinyl chloride resin may be performed at any heating rate until the temperature (250° C.) at which the first-stage weight loss begins. However, it is preferable to raise the temperature of the vinyl chloride resin at a heating rate of 20–150° C./hr., in particular, 40–100° C./hr. from the temperature, at which the first-stage weight loss begins, to the temperature (500° C.), at which the second-stage weight loss ends in order to cause a melting and decomposition reaction. It is also preferable to raise the temperature of the vinyl chloride resin at a heating rate of 100–300° C./hr., in particular, 150–250° C./hr. from the temperature, at which the second-stage weight loss ends, to 600° C. in order to eliminate chlorine. It is further preferable to hold and calcine the resin for 0–24 hours, in particular, 0.5–5 hours at 600° C. in order to make the temperature of the whole resin treated even.

Figure 2:
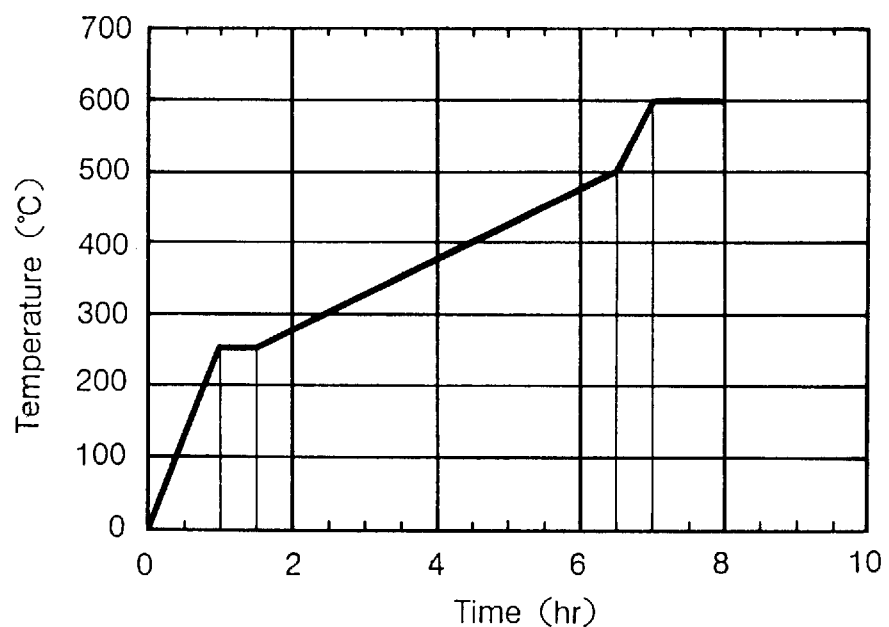
FIG. 2 diagrammatically illustrates the relationship between temperature and time upon the calcination of the vinyl chloride resin.

Therefore, the calcination of the vinyl chloride resin is performed by first heating the resin from room temperature to 250° C. over 1 hour and holding it for 0.5 hours at 250° C., for example, as illustrated in FIG. 2. The resin is then heated from 250° C. to 500° C. at a rate of 50° C./hr., and further from 500° C. to 600° C. at a rate of 200° C./hr., and held for 1 hour at 600° C., thereby obtaining carbonized product.

In this embodiment, the carbonized product is ground into particles having a particle size of 0.1–300 μm, preferably 1–100 μm and mixed with potassium hydroxide in a proportion of 1–4 parts by weight per 1 part by weight of the carbonized product. The mixture is then heated in an inert gas stream to activate the carbonized product with the alkali, thereby providing active carbon used for polarizable electrodes for an electric double layer capacitor.

The alkali activation includes the first alkali activation treatment in which the carbonized product is held for 1–20 hours at a temperature ranging from 600 to 950° C. and the second alkali activation treatment in which the temperature of the carbonized product is raised to a temperature ranging from 800 to 1,000° C. and higher than that of the first activation treatment and then immediately lowered, or the carbonized product is held for 2 hours or shorter at the temperature within the above range.

In the alkali activation treatment, the second alkali activation treatment may be performed after the first alkali activation treatment, and reversely the first alkali activation treatment may be carried out after the second alkali activation treatment. In the alkali activation treatment, both alkali activation treatments may be successively performed by conducting the second alkali activation treatment subsequently to the first alkali activation treatment, or conducting the first alkali activation treatment subsequently to the second alkali activation treatment.

Figure 3:
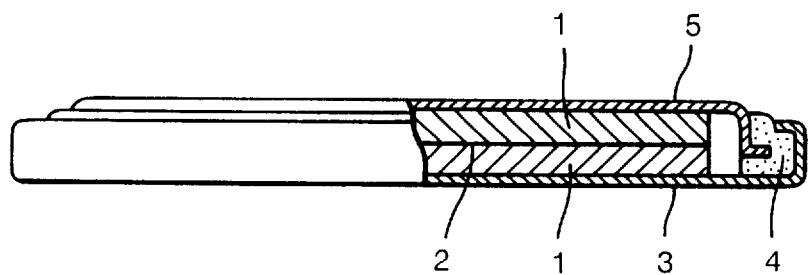
FIG. 3 is an explanatory cross-sectional view, partly broken away, of an illustrative construction of an electric double layer capacitor.

The active carbon thus obtained is mixed with a conductive material such as furnace black, a binder such as polytetrafluoroethylene, and the like to mold it. The molded article thus obtained is used as a polarizable electrode 1 for an organic solvent type electric double layer capacitor illustrated in FIG. 3.

Examples of an electrolyte impregnated into the polarizable electrode 1 may include the tetraalkylammonium salts of perchloric acid, phosphoric hexafluoride, boric tetrafluoride, trifluoroalkylsulfonic acids and tetrafluoromethanesulfonic acid, and the dialkylamine salts of perchloric acid, phosphoric hexafluoride, boric tetrafluoride, trifluoroalkylsulfonic acids and tetrafluoromethanesulfonic acid. Examples of an organic solvent dissolving the electrolyte therein may include propylene carbonate, butylene carbonate, γ-butyrolactone, acetonitrile, dimethylformamide, 1,2-dimethoxyethane, sulfolane and nitroethane.

The electrolyte is dissolved at a concentration of 0.1–3 mol/L, preferably 0.5–1.5 mol/L in the organic solvent to use the solution as an electrolytic solution. Incidentally, the organic solvent in the electrolytic solution is considered to be in a state solvated with the electrolyte ions.

A sheet of a polyolefin such as polyethylene or polypropylene, polyester, PVDF, cellulose, or the like, or a glass filter is used as a separator 2.

The active carbon according to this embodiment is controlled by the first alkali activation treatment in such a manner that the pore distribution thereof has a mode between 10 and 20 angstroms, and most of pores therein have a size easy to adsorb the electrolyte ions with which the organic solvent has been solvated in the electrolytic solution of the electric double layer capacitor. Accordingly, when polarizable electrodes for an electric double layer capacitor are formed from the active carbon, the proportion of pores contributory to the electric double layer becomes markedly high, so that the capacity per volume of the polarizable electrode is enhanced.

In addition, the active carbon prevents the resulting electric double layer capacitor from lowering its capacity by repeated charge and discharge because the functional groups on the surface of the active carbon are removed by the second alkali activation treatment.

The present invention will hereinafter be described more specifically by the following examples. However, the present invention is not limited to these examples. Incidentally, all designations of "part" or "parts" and "%" as will be used in the following examples mean part or parts by weight and wt. % unless expressly noted.

EXAMPLE 1

Preparation of active carbon

A vinyl chloride resin (PVC) was heated from room temperature to 600° C. in a nitrogen gas atmosphere in a manner illustrated in FIG. 2 to calcine and carbonize it. After the carbonized product lump thus obtained was roughly ground, it was ground for 1 hour by a motor grinder, and further for 1 hour by a planetary ball mill, thereby grinding it into fine particles having a particle size of 0.1–300 μm. This carbonized product powder in an amount of 2.5 g was mixed with 5.0 g of KOH [KOH/C (by weight)=2] in a mortar. The mixture was first held for 4 hours at 860° C. in a nitrogen gas stream in a tubular electric furnace to conduct the first alkali activation treatment. Subsequently to the first alkali activation treatment, the mixture was heated further to 950° C. and immediately allowed to cool without holding at this temperature to conduct the second alkali activation treatment, thereby obtaining active carbon. After the active carbon thus obtained was then dispersed in water, neutralized and washed with hydrochloric acid, and filtered, the filter cake was dried at 50° C. under reduced pressure, thereby obtaining raw active carbon for an electric double layer capacitor.

Charge and discharge cycle test

After 0.428 g of the raw active carbon thus obtained were kneaded with 0.047 g of particulate furnace black (Denka Black, trade name, product of Denki Kagaku Kogyo Kabushiki Kaisha) as a conductive material and 0.025 g of a fluorocarbon resin (Teflon 7J, trade name, product of Du Pont-Mitsui Fluorochemical Co., Ltd.) as a binder in a mortar, the kneaded mixture was molded into a disk 20 mm in diameter. The disk was further rolled out to stamp out two disks 20 mm in diameter from the rolled sheet, thereby providing polarizable electrodes.

The polarizable electrodes, a glass filter as a separator and a propylene carbonate solution (2 mol/L) of methylethylpyridinium tetrafluoroborate (MEPY/BF$_4$) as an electrolytic solution were used to fabricate a test cell.

Using this cell, charge and discharge were conducted repeatedly under conditions of an end electric potential upon charging of 3.5 V, an end electric potential upon discharging of 0 V and a charge and discharge current of 5 mA to measure the capacity of the cell, thereby calculating out the capacitance densities per weight and volume of the active carbon in the electrode from this capacity. The electrode density, initial capacities per weight and volume, and percent reductions of capacity after 30-cycle and 60-cycle charge and discharge tests are shown in Table 1.

EXAMPLE 2

Active carbon was prepared in exactly the same manner as in Example 1 except that subsequently to the first alkali activation treatment in Example 1, the carbonized product mixture was further heated to 950° C. and held for 0.5 hours at this temperature to conduct the second alkali activation treatment, thereby fabricating a test cell. Using this cell, charge and discharge were conducted repeatedly in exactly the same manner as in Example 1, thereby calculating out the capacity density of the active carbon in the electrode. The results are shown in Table 1.

EXAMPLE 3

Active carbon was prepared in exactly the same manner as in Example 1 except that subsequently to the first alkali activation treatment in Example 1, the carbonized product mixture was further heated to 950° C. and held for 1.0 hour at this temperature to conduct the second alkali activation treatment, thereby fabricating a test cell. Using this cell, charge and discharge were conducted repeatedly in exactly the same manner as in Example 1, thereby calculating out the capacity density of the active carbon in the electrode. The results are shown in Table 1.

EXAMPLE 4

Active carbon was prepared in exactly the same manner as in Example 1 except that subsequently to the first alkali activation treatment in Example 1, the carbonized product mixture was further heated to 950° C. and held for 2.0 hours at this temperature to conduct the second alkali activation treatment, thereby fabricating a test cell. Using this cell, charge and discharge were conducted repeatedly in exactly the same manner as in Example 1, thereby calculating out the capacity density of the active carbon in the electrode. The results are shown in Table 1.

EXAMPLE 5

Active carbon was prepared in exactly the same manner as in Example 1 except that the carbon powder obtained in Example 1 was first heated to 950° C. and allowed to cool without holding it at this temperature to conduct the second alkali activation treatment, and subsequently to the second alkali activation treatment, the carbonized product powder was allowed to cool to 860° C. and held for 4.0 hours at this temperature to conduct the first alkali activation treatment, thereby fabricating a test cell. Using this cell, charge and discharge were conducted repeatedly in exactly the same manner as in Example 1, thereby calculating out the capacity density of the active carbon in the electrode. The results are shown in Table 1.

Incidentally, in this example, KOH in an amount equal to that used in the first alkali activation treatment in Example 1 was only mixed with the carbonized product powder before the second alkali activation treatment without mixing any fresh KOH in the first activation treatment in this example.

EXAMPLE 6

Active carbon was prepared in exactly the same manner as in Example 1 except that in Example 5, the carbonized product mixture was first held for 0.5 hours at 950° C. to conduct the second alkali activation treatment, and subsequently to the second alkali treatment, the first alkali activation treatment was conducted, thereby fabricating a test cell. Using this cell, charge and discharge were conducted repeatedly in exactly the same manner as in Example 1, thereby calculating out the capacity density of the active carbon in the electrode. The results are shown in Table 1.

EXAMPLE 7

Active carbon was prepared in exactly the same manner as in Example 1 except that in Example 5, the carbonized product mixture was first held for 2.0 hours at 950° C. to conduct the second alkali activation treatment, and subsequently to the second alkali treatment, the first alkali activation treatment was conducted, thereby fabricating a test cell. Using this cell, charge and discharge were conducted repeatedly in exactly the same manner as in Example 1, thereby calculating out the capacity density of the active carbon in the electrode. The results are shown in Table 1.

Comparative Example 1

Active carbon was prepared in exactly the same manner as in Example 1 except that the carbon powder obtained in Example 1 was held for 4.0 hours at 860° C. to conduct the first alkali activation treatment, and no second alkali treatment was conducted, thereby fabricating a test cell. Using this cell, charge and discharge were conducted repeatedly in exactly the same manner as in Example 1, thereby calculating out the capacity density of the active carbon in the electrode. The results are shown in Table 1.

Comparative Example 2

Active carbon was prepared in exactly the same manner as in Example 1 except that the carbon powder obtained in Example 1 was held for 2.0 hours at 950° C. to conduct the second alkali activation treatment, and no first alkali treatment was conducted, thereby fabricating a test cell. Using this cell, charge and discharge were conducted repeatedly in exactly the same manner as in Example 1, thereby calculating out the capacity density of the active carbon in the electrode. The results are shown in Table 1.

TABLE 1

| Electrode | Initial capacity | | Percent reduction of capacity (%) | |
| --- | --- | --- | --- | --- |
| density | at 3.5 V | | After 30 | After 60 |
| (g/cc) | (F/g) | (F/cc) | cycles | cycles |
| Example 1 | 0.933 | 39.2 | 38.9 | 11.3 | 19.5 |
| Example 2 | 0.963 | 40.8 | 39.3 | 12.2 | 18.1 |
| Example 3 | 0.949 | 40.5 | 38.4 | 13.3 | 17.4 |
| Example 4 | 0.922 | 40.2 | 37.0 | 12.2 | 18.1 |
| Example 5 | 0.983 | 40.3 | 39.6 | 12.1 | 19.2 |
| Example 6 | 0.972 | 40.8 | 39.7 | 11.6 | 15.3 |
| Example 7 | 0.818 | 42.2 | 34.5 | 7.0 | 10.4 |
| Comp. Ex. 1 | 0.985 | 39.4 | 38.8 | 15.0 | 25.5 |
| Comp. Ex. 2 | 0.709 | 42.4 | 30.1 | 15.1 | 22.0 |

As apparent from Table 1, it is understood that according to the polarizable electrodes formed from the active carbon obtained in each Example of the present invention, the electrode density and initial capacity are substantially the same as those in Comparative Example 1 in which only the first alkali activation treatment was conducted, and the percent reduction of capacity is lower than those in both Comparative Example 1, and Comparative Example 2 in which only the second alkali activation treatment was conducted, and so the active carbon has marked effects.

What is claimed is:

1. A process for producing active carbon suitable for use in an electrode of an organic solvent-containing electric double layer capacitor, the process comprising
   (a) carbonizing an organic substance, to produce a carbonized product;
   (b) combining the carbonized product with an activator comprising an alkali metal hydroxide, to produce an activatable product; and (c) (1) subjecting the activatable product to a first activation treatment by heating the activatable product to a first temperature between 600° C. and 950° C., and (2) subjecting the activatable product to a second activation treatment by heating the activatable product to a second temperature, wherein the second temperature is higher than the first temperature, wherein the second activation treatment is conducted subsequent to the first activation treatment, or vice versa.

2. The process of claim 1, wherein the second activation treatment is conducted subsequent to the first activation treatment.

3. The process of claim 1, wherein the first activation treatment is conducted subsequent to the second activation treatment.

4. The process of claim 1, wherein the organic substance is a vinyl chloride resin.

5. The process of claim 1, wherein the carbonizing step (a) comprises heating the organic substance to a temperature lower than 700° C.

6. The process of claim 1, wherein the subjecting step (c)(1) comprises heating the activatable product to a first temperature between 600° C. and 950° C. for a time period of 1–20 hours.

7. The process of claim 1, wherein the second temperature is between 800° C. and 1000° C.

8. The process of claim 1, wherein the subjecting step (c)(2) comprises heating the activatable product to a second temperature between 800° C. and 1000° C. for a time period of at most 2 hours.

9. The process of claim 1, wherein the subjecting step (c)(2) comprises heating the activatable product to a second temperature between 800° C. and 1000° C., and thereafter immediately lowering the temperature.

10. The process of claim 1, wherein the alkali metal hydroxide is selected from the group consisting of lithium hydroxide, sodium hydroxide and potassium hydroxide.

11. The method of claim 1, wherein the activator is present in an amount of from 1–4 parts by weight per 1 part by weight of the carbonized product.

12. The method of claim 1, further comprising, between steps (a) and (b), grinding the carbonized product into particles having a particle size between 0.1 and 300 $\mu$m.

* * * * *